United States Patent
Won et al.

(10) Patent No.: US 12,347,897 B2
(45) Date of Patent: Jul. 1, 2025

(54) FUEL CELL SYSTEM AND METHOD OF CONTROLLING HEATER THEREOF

(71) Applicants: HYUNDAI MOTOR COMPANY, Seoul (KR); Kia Corporation, Seoul (KR)

(72) Inventors: Jong Bo Won, Yongin-si (KR); Sung Kyung Choi, Yongin-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 339 days.

(21) Appl. No.: 17/894,477

(22) Filed: Aug. 24, 2022

(65) Prior Publication Data
US 2023/0077249 A1    Mar. 9, 2023

(30) Foreign Application Priority Data
Sep. 7, 2021    (KR) .................... 10-2021-0119084

(51) Int. Cl.
*H01M 8/04029* (2016.01)
*H01M 8/04223* (2016.01)
(Continued)

(52) U.S. Cl.
CPC ... *H01M 8/04029* (2013.01); *H01M 8/04268* (2013.01); *H01M 8/04626* (2013.01); *H01M 8/04738* (2013.01); *H01M 2250/20* (2013.01)

(58) Field of Classification Search
CPC ......... H01M 2250/20; H01M 8/04022; H01M 8/04029; H01M 8/04037; H01M 8/04052;
(Continued)

(56) References Cited

U.S. PATENT DOCUMENTS 10,964,965 B2    3/2021    Park et al.
11,139,491 B2   10/2021    Kwon et al.
(Continued)

FOREIGN PATENT DOCUMENTS

CN      1910775 A    2/2007
CN    107994242 A    5/2018
(Continued)

OTHER PUBLICATIONS

Extended European search report issued on Jan. 31, 2023, in counterpart European Patent Application No. 22191275.1 (7 pages in English).
(Continued)

*Primary Examiner* — Victoria H Lynch
(74) *Attorney, Agent, or Firm* — MORGAN, LEWIS & BOCKIUS LLP

(57) ABSTRACT

The present disclosure relates to a fuel cell system and a method of controlling a heater thereof. A fuel cell system according to the present disclosure includes a cathode oxygen depletion (COD) heater that is disposed on a line through which cooling water flowing into a fuel cell stack circulates and heats the cooling water or consumes residual power of the fuel cell stack, and a controller that determines power consumption according to a target heating amount of the COD heater and controls an operation of the COD heater based on the determined power consumption.

18 Claims, 15 Drawing Sheets

(51) Int. Cl.
*H01M 8/04537* (2016.01)
*H01M 8/04701* (2016.01)

(58) Field of Classification Search
CPC ......... H01M 8/04225; H01M 8/04228; H01M 8/04253; H01M 8/04268; H01M 8/04302; H01M 8/04303; H01M 8/04358; H01M 8/04373; H01M 8/04567; H01M 8/04626; H01M 8/04723; H01M 8/04738; H01M 8/0488; H01M 8/04947; Y02E 60/50
See application file for complete search history.

(56) References Cited

U.S. PATENT DOCUMENTS

| | | |
|---|---|---|
| 11,289,722 B2 | 3/2022 | Lee et al. |
| 11,349,138 B2 | 5/2022 | Ryu |
| 11,631,870 B2 | 4/2023 | Lee et al. |
| 11,843,141 B2 | 12/2023 | Kwon et al. |
| 2008/0063902 A1 | 3/2008 | Kawasaki et al. |
| 2011/0143245 A1 | 6/2011 | Kawasaki et al. |
| 2018/0114998 A1* | 4/2018 | Kwon ............... H01M 8/04225 |
| 2019/0165398 A1 | 5/2019 | Park et al. |
| 2020/0153007 A1 | 5/2020 | Ryu |
| 2021/0175527 A1* | 6/2021 | Lee ................... H01M 8/04089 |
| 2021/0384534 A1 | 12/2021 | Kwon et al. |
| 2022/0181656 A1 | 6/2022 | Lee et al. |

FOREIGN PATENT DOCUMENTS

| | | |
|---|---|---|
| CN | 109841878 A | 6/2019 |
| CN | 111180765 A | 5/2020 |
| CN | 111029613 B | 3/2021 |
| CN | 113036184 A | 6/2021 |
| KR | 10-2009-0039892 A | 4/2009 |
| KR | 10-2019-0060593 A | 6/2019 |
| KR | 10-2020-0055287 A | 5/2020 |
| WO | WO 2004/045004 A2 | 5/2004 |

OTHER PUBLICATIONS

Korean Office Action issued on Aug. 9, 2023, in counterpart Korean Patent Application No. 10-2021-0119084 (4 pages in Korean).
Office Action issued in corresponding Chinese Patent Application No. 2022110892809 dated Apr. 25, 2025, with English translation.

* cited by examiner

FUEL CELL SYSTEM AND METHOD OF CONTROLLING HEATER THEREOF

CROSS-REFERENCE TO RELATED APPLICATION

This application claims the benefit under 35 USC 119(a) of Korean Patent Application No. 10-2021-0119084, filed in the Korean Intellectual Property Office on Sep. 7, 2021, the entire disclosure of which is incorporated herein by reference for all purposes.

BACKGROUND

1. Field

The following description relates to a fuel cell system and a method of controlling a heater thereof.

2. Description of Related Art

Fuel cell systems may generate electric energy using fuel cell stacks. For example, when hydrogen is used as a fuel for the fuel cell stack, the fuel cell stack may be alternative to solving global environmental problems, and thus R&D on the fuel cell systems has been continuously carried out.

The fuel cell system may include a fuel cell stack that generates electrical energy, a fuel supply device that supplies a fuel (hydrogen) to the fuel cell stack, an air supply device that supplies, to the fuel cell stack, oxygen in the air, which is an oxidizing agent required for electrochemical reaction, and a thermal management system (TMS) that removes reaction heat of the fuel cell stack to the outside of the system, controls an operating temperature of the fuel cell stack, and performs a water management function.

The TMS is a type of cooling device that allows antifreeze serving as cooling water to circulate to the fuel cell stack so as to maintain an appropriate temperature (for example, 60 to 70° C.) and may include a TMS line through which the cooling water circulates, a reservoir in which the cooling water is stored, a pump that allows the cooling water to circulate, an ion filter that removes ions included in the cooling water, and a radiator that emits heat of the cooling water to the outside. Further, the TMS may include a heater (for example, a cathode oxygen depletion (COD) heater) that heats the cooling water, an air conditioning device (for example, a heater) that heats or cools, using the cooling water, the inside of a device (for example, a vehicle) in which the fuel cell system is included, and the like. The TMS may maintain components of the vehicle as well as the fuel cell stack at an appropriate temperature.

Them TMS may use the heater to increase the temperature of the cooling water in the stack or use the antifreeze for the fuel cell stack as the cooling water to secure cold startability. In this case, the cooling water of the TMS line serves as a cooling medium for cooling the stack and serves as a heat medium that is rapidly heated by the heater during cold starting, is supplied to the stack, and thus increase the temperature of the stack.

The COD heater serves to contribute to stability of the stack by being operated in a shutdown mode that is a vehicle operation termination mode and consuming all power generated by the fuel cell stack and serves to increase the temperature of the cooling water to a predetermined temperature so that the fuel cell stack may be smoothly operated during initial cold starting in winter. However, the COD heater may control only an ON/OFF operation. In this case, since the amount of heat generated is linearly determined according to the amount of power generated by the stack during the ON/OFF operation, a targeted amount of heat of the COD heater cannot be determined in a predetermined manner, and accordingly, detailed thermal management control of the TMS is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel cell system includes a cathode oxygen depletion (COD) heater that is disposed on a line through which cooling water flowing into a fuel cell stack circulates and heats the cooling water or consumes residual power of the fuel cell stack, and a controller configured to determine power consumption based on a target heating amount of the COD heater and control an operation of the COD heater based on the determined power consumption.

In a cold starting mode, the controller may be further configured to determine the power consumption based on the target heating amount for heating the cooling water until a temperature of the cooling water at an inlet of the fuel cell stack reaches a reference temperature.

The controller may be further configured to determine the power consumption as a maximum load of the COD heater.

The controller may be further configured to turn off the COD heater and release the cold starting mode when the temperature of the cooling water at the inlet of the fuel cell stack becomes greater than or equal to the reference temperature.

The controller may be further configured to determine the power consumption based on the target heating amount for consuming the residual power of the fuel cell stack until an output voltage of the fuel cell stack becomes less than a reference voltage in a shutdown mode.

The controller may be further configured to determine the power consumption as a maximum load of the COD heater.

The controller may be further configured to turn off the COD heater and release the shutdown mode when the output voltage of the fuel cell stack becomes less than the reference voltage.

The COD heater may include a heater coil, a heater controller that controls a heating operation of the heater coil, a first relay that is disposed on a first control line connected to the heater controller and interrupts power supply through the first control line, and a second relay that is disposed on a second control line connected to the heater coil and interrupts power supply through the second control line.

The controller may be further configured to control the second relay to be turned off and then control the first relay to be turned on when entering a cold starting mode or a shutdown mode.

When entering the cold starting mode or the shutdown mode, the controller may be further configured to operate heater protection logic before operating the COD heater and monitor an operation state of the COD heater based on the heater protection logic while the COD heater is operating.

When a communication state of the COD heater is poor, the controller may be further configured to release communication connection of the COD heater and allow the COD heater to operate in a simple resistor mode.

When the COD heater operates in the simple resistor mode, the controller may be further configured to control the first relay to be turned off and then control the second relay to be turned on.

The controller may be further configured to control an ON or OFF operation of the COD heater according to a heating amount of the COD heater when the COD heater operates in the simple resistor mode.

The controller may be further configured to turn off the COD heater according to the heater protection logic when an operating voltage of the COD heater exceeds a reference voltage range, the operating voltage of the COD heater is less than a lower limit voltage, or a temperature of the COD heater exceeds a reference temperature and temperature control is not possible.

The controller may be further configured to adjust the power consumption of the COD heater when a temperature of the COD heater exceeds a reference temperature and temperature control is possible.

The controller may be further configured to output the power consumption of the COD heater by a predetermined ratio compared to a maximum load of the COD heater when the temperature of the COD heater being operated exceeds the reference temperature but the temperature control is possible in the shutdown mode.

In another general aspect, a method of controlling a heater of a fuel cell system includes determining power consumption according to a target heating amount of a cathode oxygen depletion (COD) heater that is disposed on a line through which cooling water flowing into a fuel cell stack circulates and heats the cooling water or consumes residual power of the fuel cell stack, and controlling an operation of the COD heater based on the determined power consumption.

The determining of the power consumption may include determining the power consumption based on the target heating amount for heating the cooling water until a temperature of the cooling water at an inlet of the fuel cell stack reaches a reference temperature in a cold starting mode.

The determining of the power consumption may include determining the power consumption based on the target heating amount for consuming the residual power of the fuel cell stack until an output voltage of the fuel cell stack becomes less than a reference voltage in a shutdown mode.

Further, the method of controlling a heater according to an embodiment of the present disclosure may further include operating heater protection logic before the COD heater is operated when entering a cold starting mode or a shutdown mode, and monitoring an operation state of the COD heater based on the heater protection logic while the COD heater is operating.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
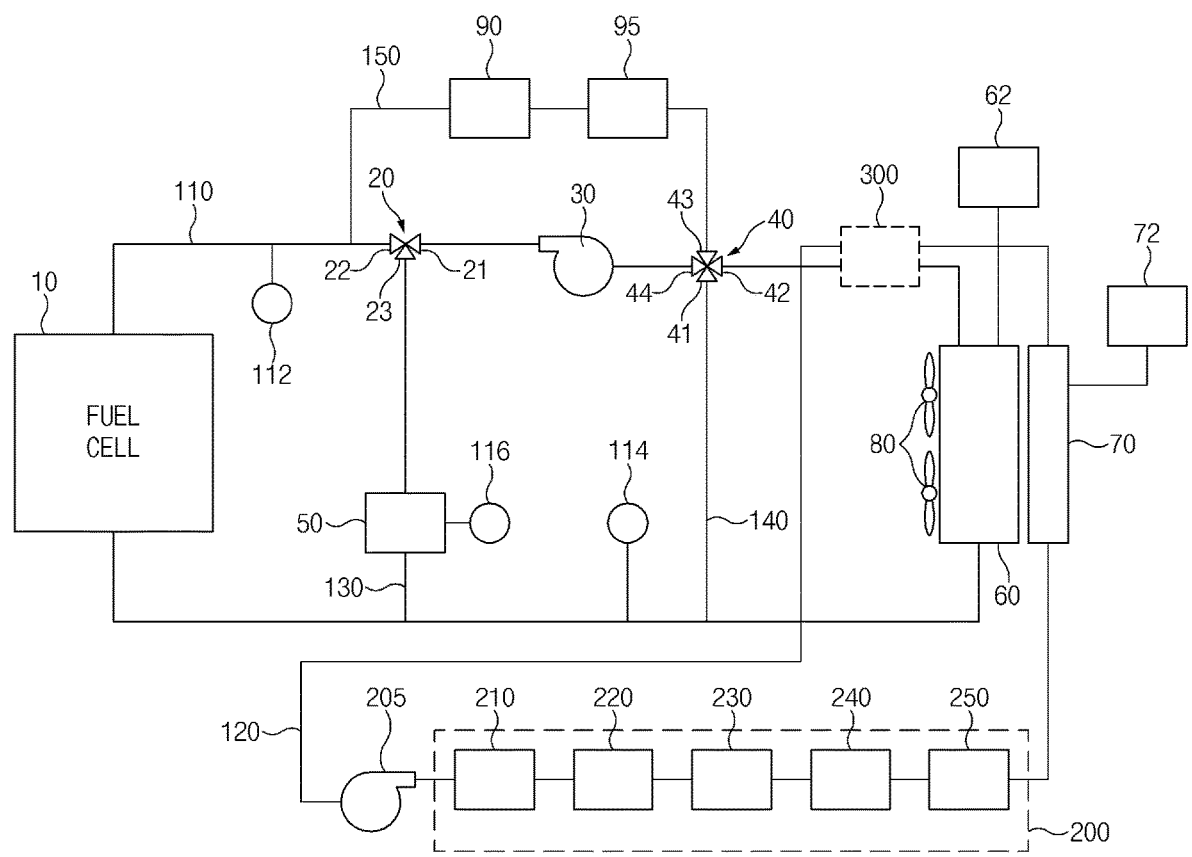
FIG. 1 is a view illustrating a fuel cell system according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 2A:
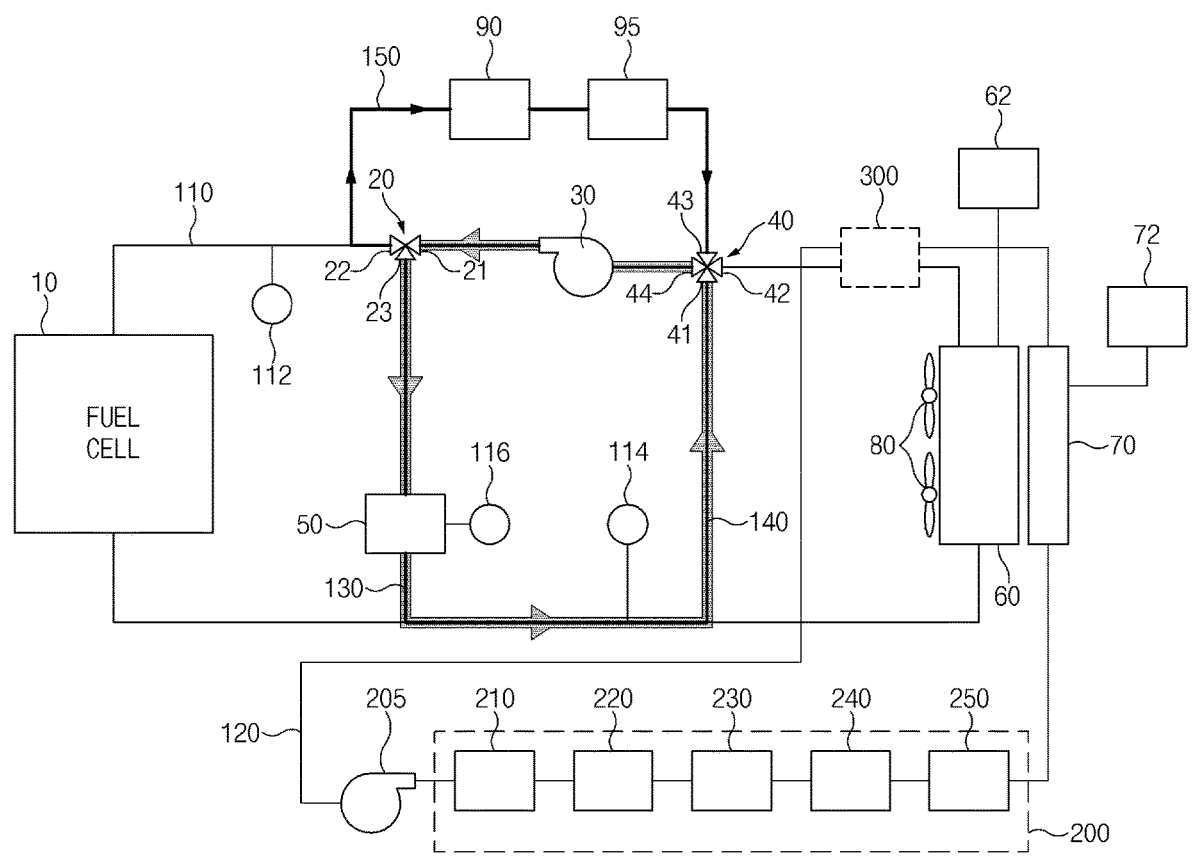
FIGS. 2A and 2B are views illustrating a first cooling water flow of the fuel cell system according to an embodiment of the present disclosure.
Figure 2B:
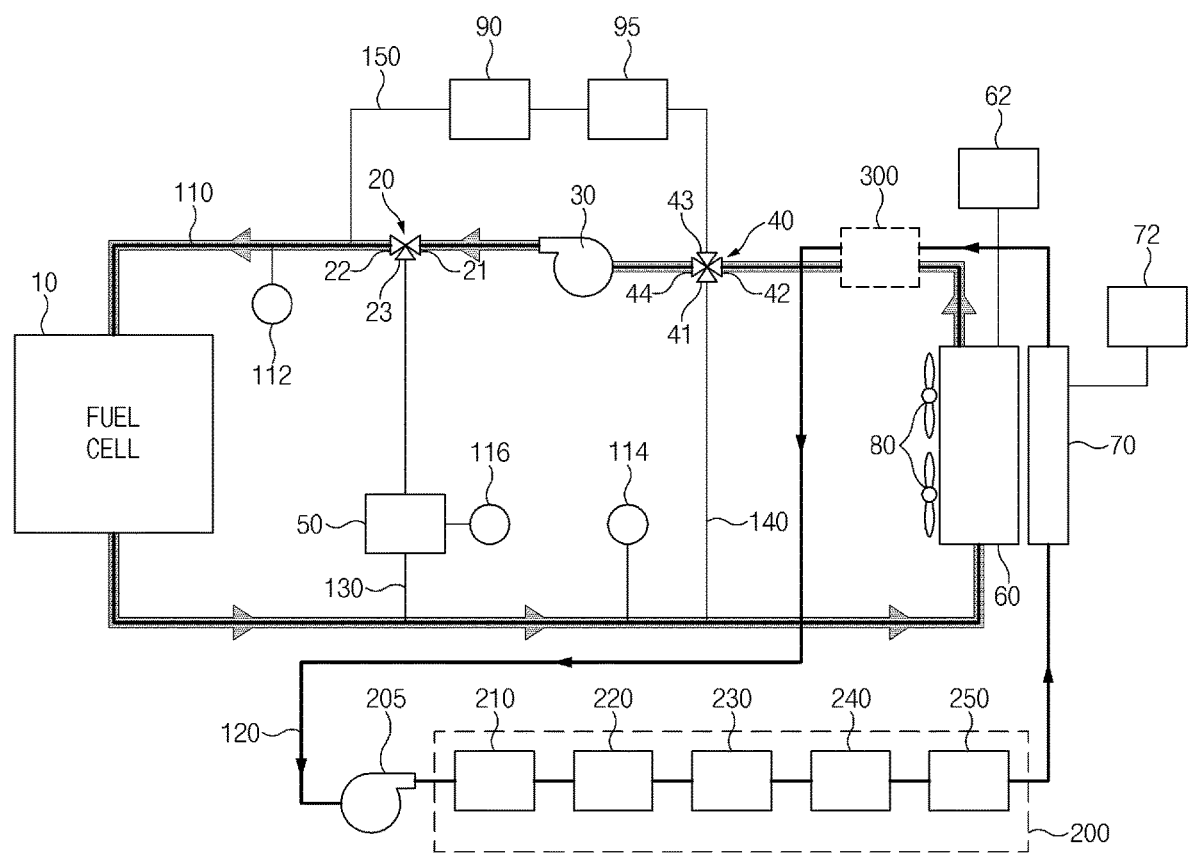
Figure 3:
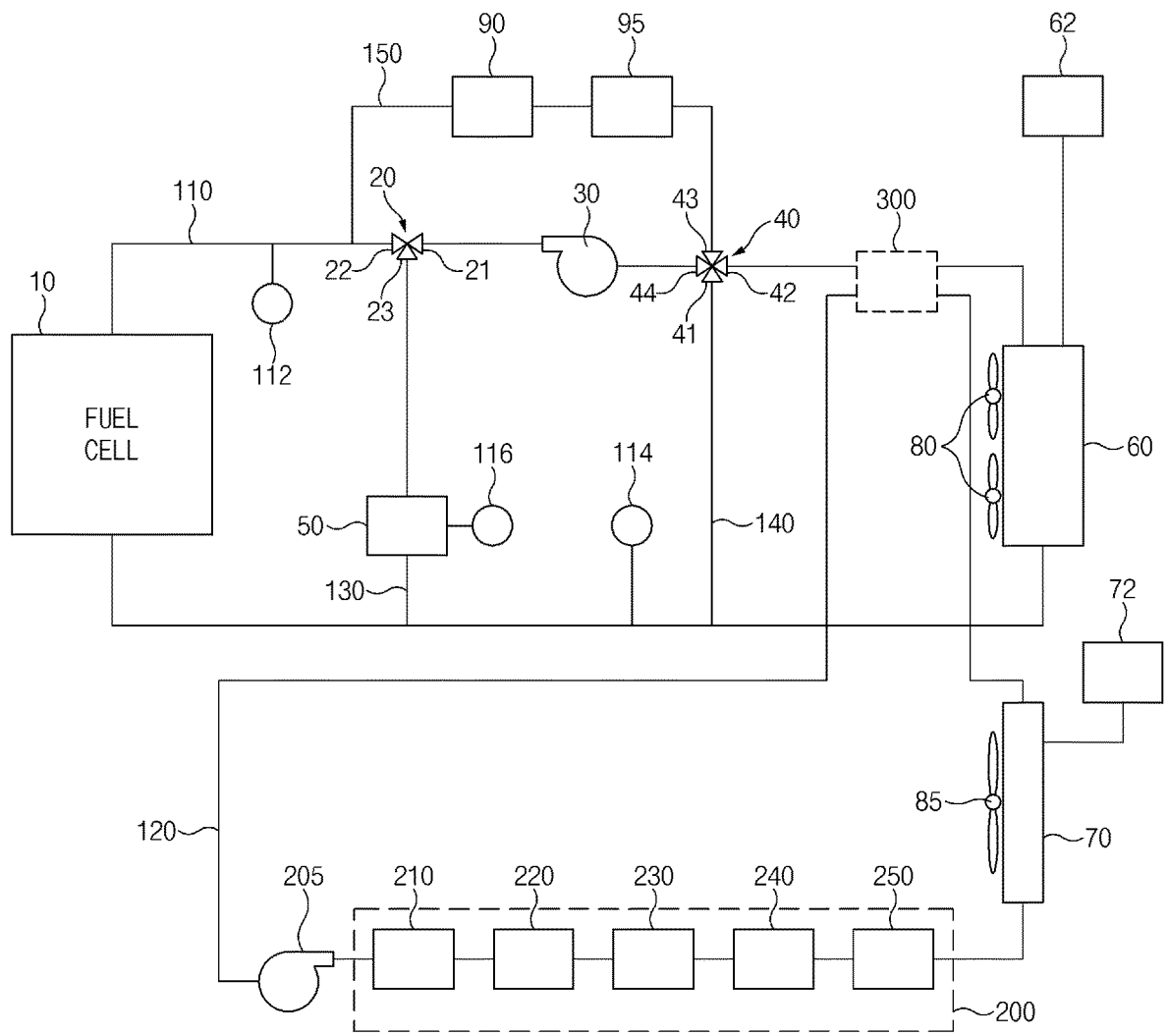
FIG. 3 is a view illustrating a fuel cell system according to another embodiment of the present disclosure.
Figure 4:
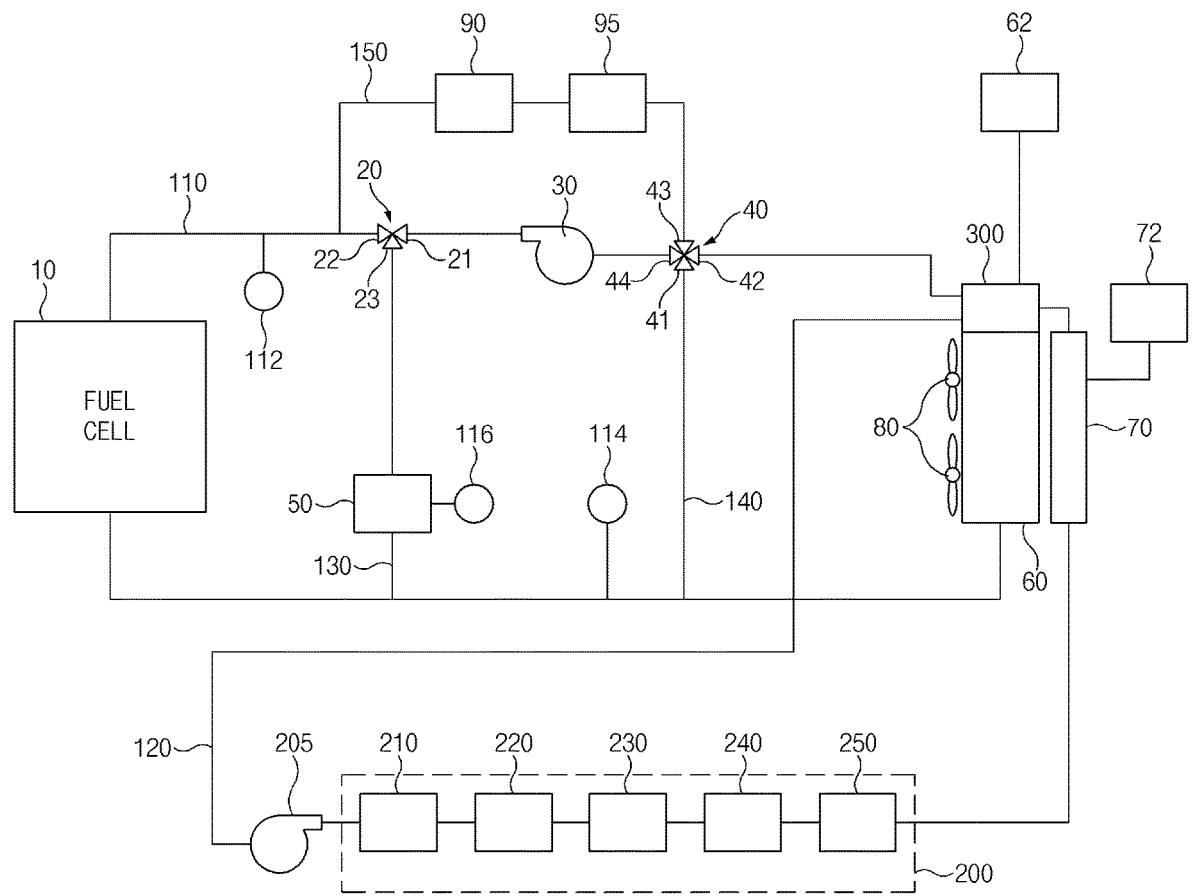
FIG. 4 is a view illustrating a fuel cell system according to still another embodiment of the present disclosure.

FIGS. 1 to 4 are views illustrating a fuel cell system according to various embodiments, FIG. 1 is a view illustrating a fuel cell system according to an embodiment of the present disclosure, FIGS. 2A and 2B are views illustrating a first cooling water flow of the fuel cell system according to an embodiment of the present disclosure, and FIGS. 3 and 4 are views illustrating a fuel cell system according to other embodiments.

Referring to FIG. 1, a vehicle fuel cell system may include a first cooling line 110 through which first cooling water passing through a fuel cell stack 10 of a vehicle circulates and a second cooling line 120 through which second cooling water passing through power electronic parts 200 of the vehicle circulates. In an embodiment, the fuel cell system may further include a heat exchanger 300 that exchanges heat between the first cooling water and the second cooling water, but the heat exchanger 300 may be omitted.

The fuel cell system may include a first connection line 130, a second connection line 150, and a third connection line 140 to form a heating loop (a heating circulation path or a heating loop) with the first cooling line 110 or form a cooling line with the first cooling line 110. The first cooling water may be cooled or heated while circulating through the first connection line 130, the second connection line 150, or the third connection line 140. As an example, in an initial starting state of the vehicle, to secure the cold starting capability, the first cooling line 110 may form the heating loop with the first connection line 130 and the third connection line 140 as illustrated in FIG. 2A, and during driving, to discharge heat generated by the fuel cell stack 10 to the outside, the first cooling line 110 may form a cooling loop in which the first cooling water passes through a first radiator 60 as illustrated in FIG. 2B. Although not illustrated in FIGS. 2A and 2B, a portion of the first cooling water may flow to the third connection line 140 and the other thereof may pass through the first radiator 60 according to the amount of cooling required for the fuel cell system. In another embodiment, when the temperature of outside air is as high as a specified temperature, the first cooling line 110 does not form the heating loop, and the fuel cell system may secure the starting capability through the heat of the fuel cell stack 10. The fuel cell stack 10, a first valve 20, a first pump 30, a second valve 40, and the first radiator 60 may be arranged on the first cooling line 110 through which the first cooling water circulates.

The fuel cell stack 10 (or referred to as a "fuel cell") may be formed in a structure capable of producing electricity through an oxidation-reduction reaction of a fuel (for example, hydrogen) and an oxidizing agent (for example, air). As an example, the fuel cell stack 10 may include a membrane electrode assembly (MEA) in which catalytic electrode layers in which electrochemical reactions occur are attached to both sides with respect to a center of an electrolyte membrane through which hydrogen ions move, a gas diffusion layer (GDL) that evenly distributes reactive gases and transfers generated electrical energy, a gasket and a fastening mechanism for maintaining airtightness and appropriate fastening pressure of the reactive gases and the first cooling water, a gasket and a fastening mechanism for maintaining airtightness and appropriate fastening pressures of the reactive gases and the first cooling water, and a bipolar plate that moves the reactive gases and the first cooling water.

In the fuel cell stack 10, the hydrogen as the fuel and the air (oxygen) as the oxidizing agent are supplied to an anode and a cathode of the MEA through a passage of the bipolar plate. The hydrogen may be supplied to the anode and the air may be supplied to the cathode. The hydrogen supplied to the anode is decomposed into hydrogen ions (protons) and electrons by a catalyst of electrode layers configured on both sides of the electrolyte membrane. Among them, only the hydrogen ions may be selectively transferred to the cathode through the electrolyte membrane that is a positive ion exchange membrane, and at the same time, the electrons may be transferred to the cathode through the GDL and the bipolar plate that are conductors. In the cathode, the hydrogen ions supplied through the electrolyte membrane and the electrons transferred through the bipolar plate may react with oxygen in the air supplied to the cathode by an air supply device to produce water. Due to movement of the hydrogen ions occurring in this case, a flow of the electrons through an external conducting wire may occur, and a current may be generated by the flow of the electrons.

The first valve 20 may switch a flow path of the first cooling water on the first cooling line 110 to the first connection line 130 in which a heater 50 is disposed or the fuel cell stack 10. For example, the first valve 20 may be connected to one end of the first pump 30, one end of the first connection line 130, and one end of the fuel cell stack 10 on the first cooling line 110. The first valve 20 may include various valve devices capable of selectively switching the flow path of the first cooling water. As an example, the first valve 20 may be a three-way valve. In this case, the first valve 20 may include a first port 21 connected to the first cooling line 110 so that the first cooling water pumped by the first pump 30 flows thereinto, a second port 22 connected to the first cooling line 110 so that the first cooling water passing through the first valve 20 flows into the fuel cell stack 10, and a third port 23 connected to one end of the first connection line 130. As the second port 22 and the third port 23 of the first valve 20 are opened or closed, the flow path of the first cooling water may be switched to the heater 50 of the first connection line 130 or the fuel cell stack 10. That is, when the second port 22 is opened and the third port 23 is blocked, the first cooling water flows into the fuel cell stack 10, and in contrast, when the third port 23 is opened and the second port 22 is blocked, the first cooling water may flow into the heater 50 through the first connection line 130.

The first connection line 130 may form the heating loop (a heating circulation path) with the first cooling line 110 to heat the first cooling water. For example, the first cooling water flowing along the first connection line 130 may be heated while passing through the heater 50 installed in the first connection line 130. One end of the first connection line 130 may be connected to the first cooling line 110 at a first point located between an outlet of the first pump 30 and the fuel cell stack 10, and the other end of the first connection line 130 may be connected to the first cooling line 110 at a second point located between an inlet of the first pump 30 and the fuel cell stack 10. Here, the inlet of the first pump 30 may be defined as an inlet through which the first cooling water flows into the first pump 30. Further, the outlet of the first pump 30 may be defined as an output through which the first cooling water passing through the first pump 30 is discharged. Further, a section between the outlet of the first pump 30 and the fuel cell stack 10 may be defined as a section through which the first cooling water discharged from the first pump 30 flows to a first cooling water inlet (not illustrated) of the fuel cell stack 10. Further, a section between the inlet of the first pump 30 and the fuel cell stack 10 may be defined as a section through which the first cooling water discharged from a cooling water outlet (not illustrated) of the fuel cell stack 10 flows to the inlet of the first pump 30.

The first pump 30 may be set such that the first cooling water forcibly flows. The first pump 30 may include various devices capable of pumping the first cooling water, and the type of the first pump 30 and the number of first pumps 30 are not limited to the present document.

The second valve 40 may switch the flow path of the first cooling water on the first cooling line 110 to the first radiator 60 or the fuel cell stack 10. For example, the second valve 40 may be provided on the first cooling line 110 to be located between the first pump 30 and the first radiator 60 and may be connected to one end of the third connection line 140 and an outlet of the first radiator 60. The second valve 40 may include various valve devices capable of selectively switching the flow path of the first cooling water to the first radiator 60 or the fuel cell stack 10. As an example, the second valve 40 may be a four-way valve or a three-way valve. In the case of the three-way valve, the second valve 40 may include a first port 41 connected to the third connection line 140, a second port 42 connected to the first cooling line 110 so that the first cooling water passing through the first radiator 60 flows thereinto, and a fourth port 44 connected to the first cooling line 110 so that the first cooling water flows into the first pump 30, and in the case of the four-way valve, the second valve 40 may further include the third port 43 connected to one end of the second connection line 150. As the first port 41 and the second port 42 of the second valve 40 are opened or closed, the flow path of the first cooling water may be switched to the first radiator 60 or the fuel cell stack 10. That is, when the first port 41 is opened and the second port 42 is blocked, the first cooling water flows into the fuel cell stack 10 without passing through the first radiator 60, and in contrast, when the second port 42 is opened and the first port 41 is blocked, the first cooling water may flow into the fuel cell stack 10 after passing through the first radiator 60. According to an opening amount of the second valve 40, a portion of the first cooling water may pass through the first radiator 60 and the other portion thereof may flow along the third connection line 140.

The second connection line 150 may form the heating loop with the first cooling line 110 to heat an air conditioning device 90. As an example, the second connection line 150 may form a loop that heats a heater (not illustrated) of the air conditioning device 90. One end of the second connection line 150 may be connected to the first cooling line 110 between a first point (a point at which one end of the first connection line 130 is connected to the first cooling line 110) and an inlet of the fuel cell stack 10, and a portion of the first cooling water may circulate through the second connection line 150. The other end of the second connection line 150 may be connected to the first cooling line 110 between the first pump 30 and a second point (a point at which the other end of the first connection line 130 is connected to the first cooling line 110).

The second connection line 150 may be provided with an ion filter 95 that filters ions of the first cooling water passing through the air conditioning device 90. When electrical conductivity of the first cooling water increases due to corrosion or exudation of a system, electricity flows to the first cooling water to cause a short circuit of the fuel cell stack 10 or cause a current to flow toward the first cooling water, and thus the first cooling water should maintain low electrical conductivity. The ion filter 95 may be set to remove the ions included in the first cooling water so that the electrical conductivity of the first cooling water may be maintained at a predetermined level or less. In this way, during cold starting during which the supply of the first cooling water flowing to the fuel cell stack 10 is blocked (the second port 22 of the first valve 20 is blocked), the first cooling water circulates (passes through a temperature increasing loop) via the heater 50 of the first connection line 130, and at the same time, circulates along the second connection line 150. Accordingly, even in the cold starting, the filtering by the ion filter 95 provided in the second connection line 150 may be performed (the ions included in the first cooling water is removed). Thus, the electrical conductivity of the first cooling water flowing into the fuel cell stack 10 immediately after the cold starting may be maintained at a certain level or less.

The third connection line 140 may form a circulation path with the first cooling line 110 so that the first cooling water flows into the fuel cell stack 10 without passing through the first radiator 60. Here, a portion of the first cooling water may be cooled via the first radiator 60 along the first cooling line 110, and another portion of the first cooling water may move along the third connection line 140. In this case, the first cooling water cooled by the first radiator 60 is joined to the first cooling water passing through the third connection line 140 and thus the temperature thereof may increase. As an example, one end of the third connection line 140 may be connected to the first cooling line 110 between the first pump 30 and the first radiator 60, and the other end of the third connection line 140 may be connected to the first cooling line 110 between the cooling water outlet of the fuel cell stack 10 and the first radiator 60.

The first radiator 60 may be set to cool the first cooling water. The first radiator 60 may be formed in various structures capable of cooling the first cooling water, and the present disclosure is not restricted or limited by the type and structure of the first radiator 60. The first radiator 60 may be connected to a first reservoir 62 in which the first cooling water is stored.

The fuel cell system may include a first temperature sensor 112 that measures the temperature of the first cooling water between the fuel cell stack 10 and the first point (the first valve 20), a second temperature sensor 114 that measures the temperature of the first cooling water between the other end of the first connection line 130 and the first pump 30, and a third temperature sensor 116 that measures the temperature of the first cooling water in the heater 50. The fuel cell system may control an inflow rate of the first cooling water flowing into the fuel cell stack 10 on the basis of the temperatures measured by the first temperature sensor 112, the second temperature sensor 114, and the third temperature sensor 116. As an example, when the measured temperature of the first cooling water circulating along the first cooling line 110 is lower than a predetermined target temperature, the inflow rate of the first cooling water may be controlled to become lower than a preset inflow rate.

The second cooling line 120 may pass through the power electronic part 200, and the second cooling water may circulate along the second cooling line 120. Here, the power electronic part 200 of the vehicle may be understood as a component using power of the vehicle as an energy source, and the present disclosure is not restricted or limited by the type and number of the power electronic part 200. For example, the power electronic part 200 may include at least one of a bi-directional high voltage DC-DC converter (BHDC) 210 provided between the fuel cell stack 10 and a high-voltage battery (not illustrated) of the vehicle, a blower pump control unit (BPCU) 220 that controls a blower (not illustrated) for supplying outside air for driving the fuel cell stack 10, a low-voltage DC-DC converter (LDC) 230 that converts DC high voltage supplied from the high-voltage battery into DC low voltage, an air compressor (ACP) 240 for compressing air supplied to the fuel cell stack 10, and an air cooler 250. Although not illustrated in FIGS. 1 to 4, the power electronic part 200 may further include a DC-DC buck/boost converter.

A second pump 205 for allowing the second cooling water to forcibly flow may be disposed on the second cooling line 120. The second pump 205 may include a pumping device capable of pumping the second cooling water, and the type and number of the second pump 205 are not limited to the present document.

A second radiator 70 for cooling the second cooling water may be disposed on the second cooling line 120. The second radiator 70 may be formed in various structures capable of cooling the second cooling water, and the type and structure of the second radiator 70 is not restricted or limited. The second radiator 70 may be connected to a second reservoir 72 in which the second cooling water is stored.

In an embodiment, as illustrated in FIG. 1, the first radiator 60 and the second radiator 70 may be simultaneously cooled by one cooling fan 80. As an example, the first radiator 60 and the second radiator 70 may be arranged side by side, and the cooling fan 80 may be set to blow outside air to the first radiator 60 and the second radiator 70. As the first radiator 60 and the second radiator 70 are simultaneously cooled by the one cooling fan 80, the structure of the fuel cell system may be simplified, degree of freedom of design and space utilization may be improved, and power consumption for cooling the first radiator 60 and the second radiator 70 may be minimized.

In another embodiment, as illustrated in FIG. 3, the first cooling fan 80 for cooling the first radiator 60 and a second cooling fan 85 for cooling the second radiator 70 may be separately arranged. In this case, when the fuel cell system controls the number of rotations of the first cooling fan 80, a parameter related to a thermal load of the power electronic part 200 may be excluded. Although embodiments described below are based on the structure of the fuel cell system of FIG. 1, the same principle may be applied to the structure of the fuel cell system of FIG. 3.

Referring back to FIG. 1, the heat exchanger 300 may be set to exchange the heat between the first cooling water and the second cooling water. When the heat exchanger 300 is included, the first cooling line 110 and the second cooling line 120 may constitute a thermal management system (TMS) line through which the first cooling water and the second cooling water flows while heat is exchanged therebetween, and in this case, the first cooling water or the second cooling water may be used as a cooling medium or a heat medium on the TMS line. For example, since the temperature of the second cooling water for cooling the power electronic part is relatively lower than the temperature of the first cooling water for cooling the fuel cell stack 10, the fuel cell system may lower the temperature of the first cooling water without increasing the capacities of the first radiator 60 and the cooling fan 80 by exchanging the heat between the first cooling water and the second cooling water, cooling efficiency of the fuel cell stack 10 may be improved, and safety and reliability may be improved. Further, since the fuel cell system may lower the temperature of the first cooling water while a vehicle (for example, a construction machinery) that cannot use a driving wind is stopped, high-output operation of the fuel cell stack 10 is secured, and safety and durability are improved.

In an embodiment, the heat exchanger 300 may be connected to the first cooling line 110 between the outlet of the first radiator 60 and the fuel cell stack 10, and the second cooling line 120 may connect the outlet of the second radiator 70 and the power electronic part to pass through the heat exchanger 300. For example, the first cooling water may flow along the heat exchanger 300 connected to the first cooling line 110, and the second cooling line 120 may pass through an inside of the heat exchanger 300 so that the second cooling line 120 is exposed to the first cooling water (for example, the first cooling water flows along a circumference of the second cooling line 120). In this way, the fuel cell system may lower the temperature of the first cooling water flowing into the fuel cell stack 10 by exchanging heat between the first cooling water and the second cooling water. A first temperature of the first cooling water passing through the first radiator 60 may be formed to be higher than a second temperature of the second cooling water passing through the second radiator 70, and a third temperature of the first cooling water passing through the heat exchanger 300 may be formed to be lower than the first temperature. As an example, the first temperature of the first cooling water may be formed to be higher than the second temperature of the second cooling water by 10° C., and the third temperature of the first cooling water passing through the heat exchanger 300 (exchanging heat with the second cooling water) may be formed to be lower than the first temperature by 1° C.

The heat exchanger 300 according to FIGS. 1 to 3 may be disposed separately from the first radiator 60, but the heat exchanger 300 according to another embodiment may be directly connected to the first radiator 60 as illustrated in FIG. 4. For example, the heat exchanger 300 may be connected to a designated position (an upper left end) of the first radiator 60, but the present disclosure is not limited thereto. When the heat exchanger 300 is connected to the upper left end of the first radiator 60, the first radiator 60 and the heat exchanger 300 may be implemented as illustrated in FIGS. 5A and 5B.

Figure 5A:
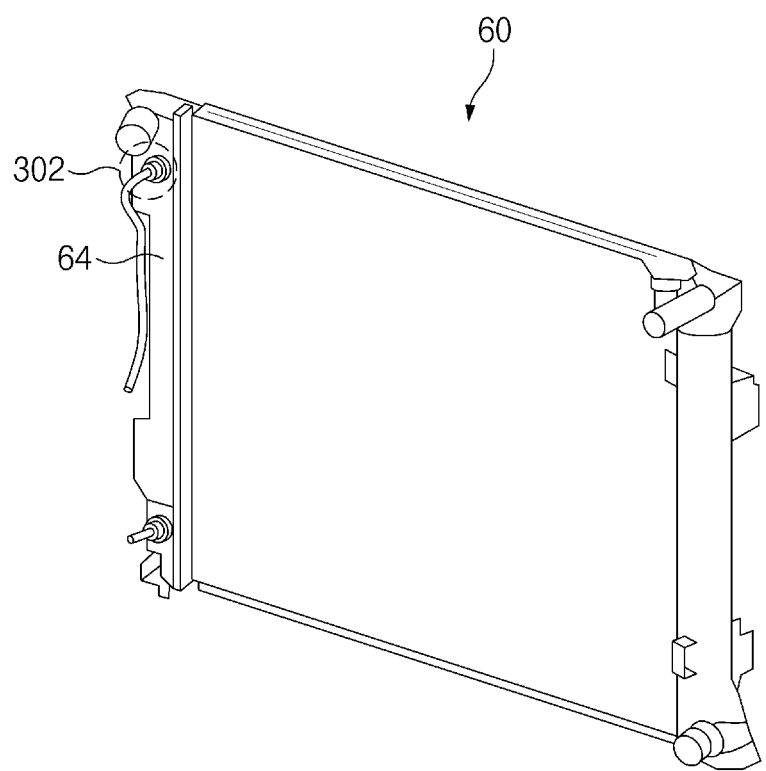
FIGS. 5A and 5B are views illustrating a first pipe and a second pipe according to various embodiments.
Figure 5B:
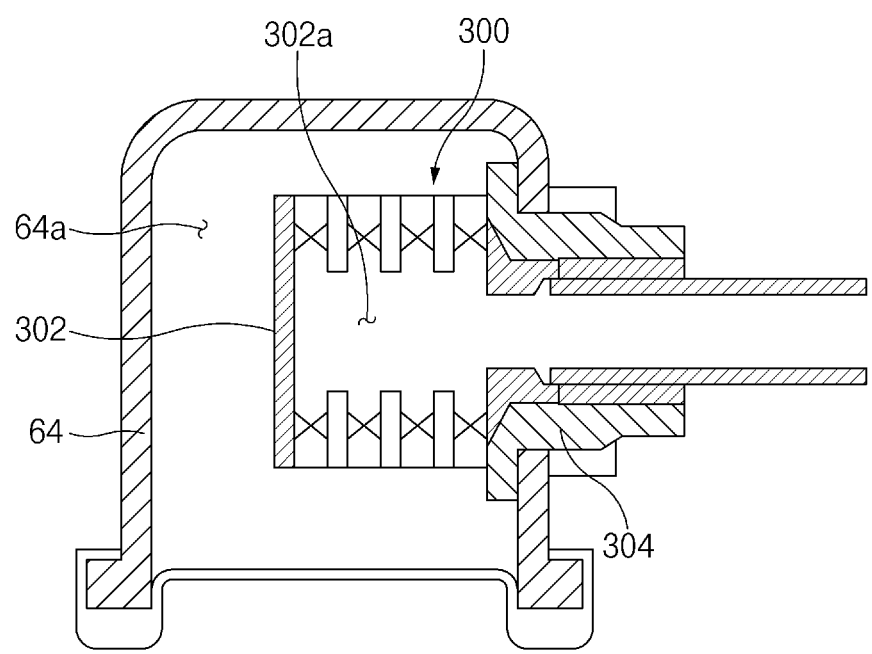

FIGS. 5A and 5B describe a first pipe and a second pipe according to various embodiments.

Referring to FIGS. 5A and 5B, the first radiator 60 may include a first pipe 64 forming a first flow path 64*a* through which the first cooling water flows, the heat exchanger 300 may include a second pipe 302 provided to exchange heat with the first cooling water inside the first flow path 64*a*, and the second cooling water may flow along the second pipe 302 and exchange heat with the first cooling water in the first flow path 64*a*. The second pipe 302 may form a second flow path 302*a* through which the second cooling water flows, and at least a portion of the second pipe 302 may be exposed to the first cooling water inside the first flow path 64*a*. The shape and structure of the second pipe 302 may be variously changed according to required conditions and design specifications, and the present disclosure is not restricted or limited by the shape and structure of the second pipe 302. According to an embodiment, to increase a cooling effect of the first cooling water, a heat dissipation fin for increasing a contact area on an outer surface of the second pipe exposed to the first cooling water may be formed. According to an embodiment, a sealing member 304 (for example, rubber or silicone) may be provided between the first pipe 64 and the second pipe 302. In this way, as the sealing member 304 is provided between the first pipe 64 and the second pipe 302, a sealed state of the first flow path 64*a* may be more stably maintained.

In the case of a vehicle that requires high power even when stopped such as a construction machinery, since cooling performance of the power electronic part 200 should be secured, the fuel cell system according to embodiments may determine the number of rotations of the second pump 205 in consideration of the number of rotations of the cooling fan 80 or 85, outside temperature, and targeted cooling performance of the power electronic part 200. Further, the fuel cell system may determine the number of rotations of the second pump 205 in consideration of at least one of arrangement of the heat exchanger 300, a structure (for example, a duel-type or multi-type) of the cooling fan, and inflow air volumes of the radiators 60 and 70, and thus cooling performance in the fuel cell system in which the first cooling line 110 and the second cooling line 120 coexist may be optimized.

Figure 6:
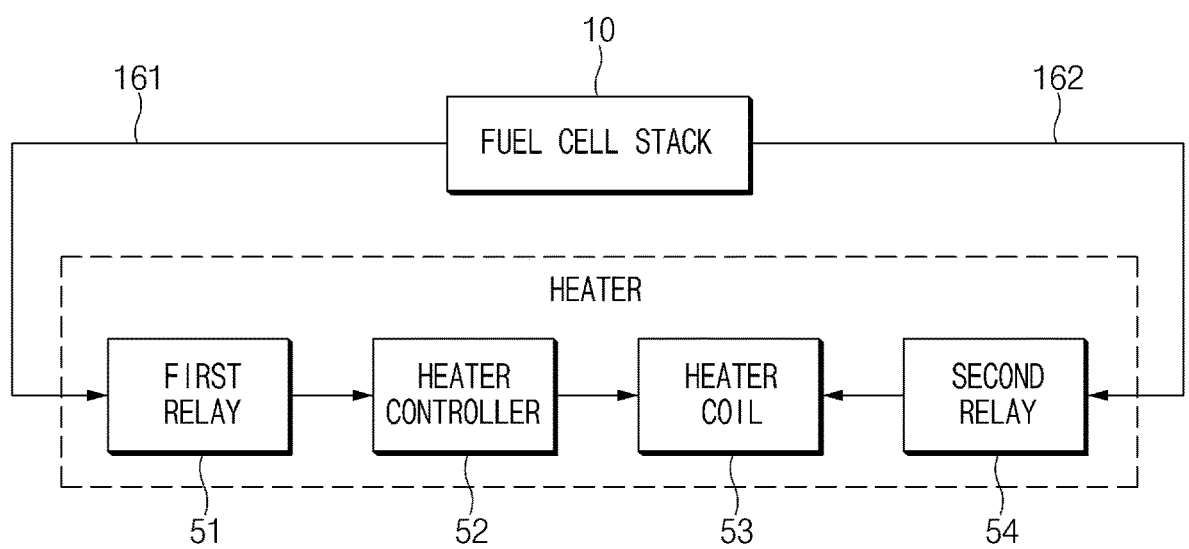
FIG. 6 is a view illustrating a detailed configuration of a heater according to an embodiment of the present disclosure.

FIG. 6 is a view illustrating a detailed configuration of a heater according to an embodiment of the present disclosure.

Referring to FIG. 6, the heater 50 is disposed on the first connection line 130 connected to the first cooling line 110 through which the first cooling water circulates and heats the first cooling water when a flow path of the first cooling water circulates along the first connection line 130. As an example, when the first cooling water flows into the first connection line 130 during cold starting, the heater 50 may heat the first cooling water introduced through the first connection line 130. In this case, the first cooling water heated by the heater 50 flows into the fuel cell stack 10 through the first cooling line 110 connected to the first connection line 130, and thus cold startability may be secured.

Here, the heater may be a cathode oxygen depletion (COD) heater in which a COD and the heater are coupled. The COD heater may serve as a heating device for heating the first cooling water to secure cold startability in winter and may serve to consume residual power of the fuel cell stack to prevent degradation of durability of the fuel cell stack during shutdown. Here, to prevent degradation of durability of the fuel cell stack due to corrosion of catalyst-supported carbon when a fuel cell vehicle is shut down, the COD heater may consume, as heat, power generated by reacting hydrogen and oxygen in a state in which the COD is connected to both ends of the fuel cell stack, and thus remove residual oxygen in the fuel cell stack.

The COD heater may include a heater controller 52 that controls an operation of a heater coil 53 and controls a heater temperature, the heater coil 53 that generates heat on the basis of power applied through a first control line 161 or a second control line 162, a first relay 51 that is disposed on the first control line 161 connected to the heater controller 52 and opens or closes a passage through which power generated by the fuel cell stack is applied to the heater controller 52, and a second relay 54 that is disposed on the second control line 162 connected to the heater coil 53 and opens or closes a passage through which power generated by the fuel cell stack is applied to the heater coil 53.

The first control line 161 may be connected to one end of the heater coil 53 through the first relay 51 and the heater controller 52. The second control line 162 may be connected to the other end of the heater coil 53 through the second relay 54. The first relay 51 and the second relay 54 are not turned on at the same time, and one of the relays is controlled to be turned off, and the other relay may then be controlled to be turned on.

The ON/OFF operations of the first relay 51 and the second relay 54 may be controlled by a high-order controller of the COD heater, for example, the fuel cell system.

Figure 7:
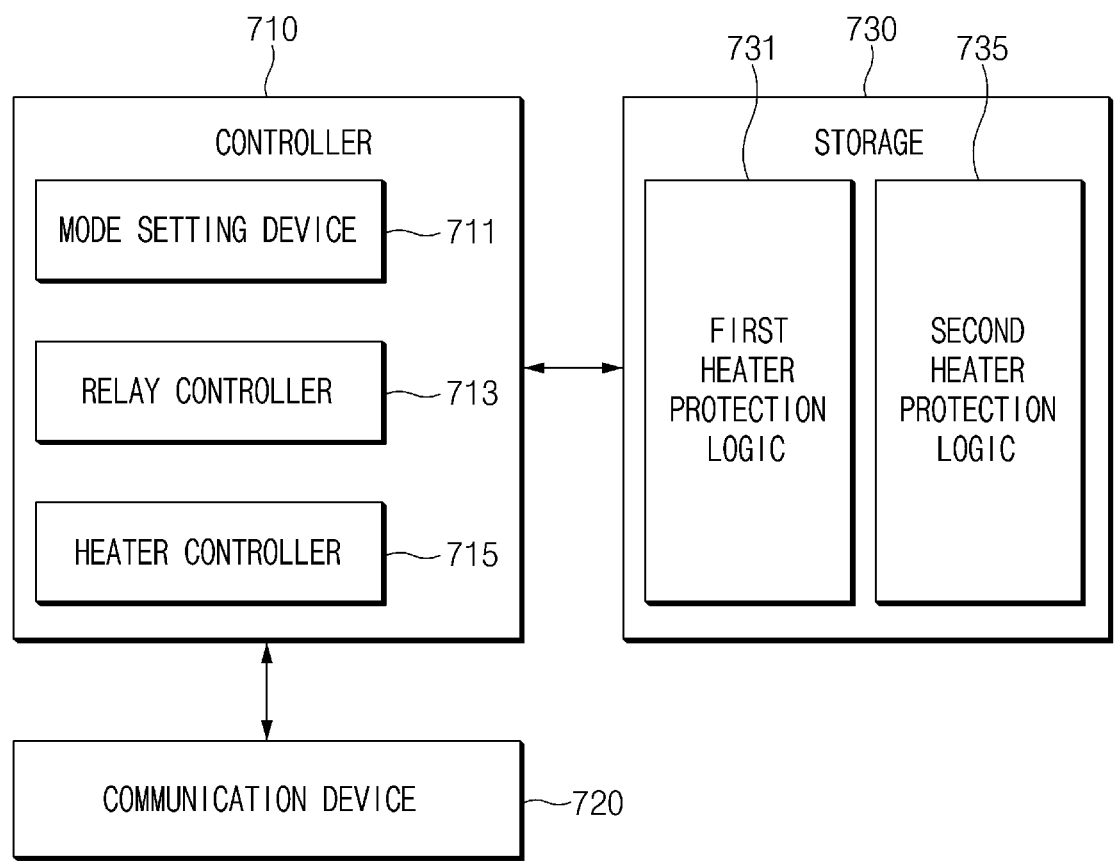
FIG. 7 is a view illustrating a control block diagram of the fuel cell system according to an embodiment of the present disclosure.

FIG. 7 is a view illustrating a control block diagram of the fuel cell system according to an embodiment of the present disclosure.

Referring to FIG. 7, the fuel cell system may include a controller 710, a communication device 720, and storage 730.

The controller 710 may be a hardware device such as a processor or a central processing unit (CPU) or a program implemented by the processor. The controller 710 may be connected to respective components of the fuel cell system and perform an overall function of the fuel cell system.

The controller 710 controls the relay on the control line connected to the COD heater when switching to a cold starting mode or a shutdown mode and controls an operation of the COD heater. To this end, the controller 710 may include a mode setting device 711 for setting the cold starting mode or the shutdown mode, a relay controller 713 for controlling the first relay 51 and the second relay 54 of the COD heater, and a heater controller 715 for controlling the operation of the COD heater during the cold starting mode or the shutdown mode.

The components included in the controller 710 may be implemented as individual devices (or programs) or may be implemented in the form of one integrated module.

First, the mode setting device 711 may set entry and release of the cold starting mode. As an example, the mode setting device 711 may set the entry of the cold starting mode when there is a cold starting mode entry request and may set the release of the cold starting mode when an inlet cooling water temperature condition of the fuel cell stack satisfies a standard condition.

Further, the mode setting device 711 may set entry and release of the shutdown mode. As an example, the mode setting device 711 may set the entry of the shutdown mode when there is a shutdown mode entry request and may set the release of the shutdown mode when an output voltage condition of the fuel cell stack satisfies a standard condition.

Further, the mode setting device 711 may set or release a simple resistor mode for the COD heater. As an example, the mode setting device 711 may set the simple resistor mode for the COD heater when communication connection is released due to a poor communication state of the COD heater. Of course, the mode setting device 711 may release the simple resistor mode when the COD heater is normally operated.

When entering the cold starting mode or the shutdown mode, the relay controller 713 may control the first relay 51 connected to the heater controller 52 and the second relay 54 directly connected to the heater coil 53 to be turned on/off according to a state of the COD heater.

As an example, when entering the cold starting mode, the relay controller 713 may control the second relay 54 to be turned off to block power directly applied to the heater coil 53 and control the first relay 51 to apply power through the heater controller 52. Here, the relay controller 713 may not control the first relay 51 and the second relay 54 at the same time and control the first relay 51 to be turned on after controlling the second relay 54 to be turned off.

Meanwhile, when the COD heater is operated in the simple resistor mode due to the poor communication state of the COD heater, the relay controller 713 may control the first relay 51 to be turned off to block power applied to the heater controller 52 and control the second relay 54 to directly apply power to the heater coil 53. Likewise, the relay controller 713 may not control the first relay 51 and the second relay 54 at the same time and control the second relay 54 to be turned on after controlling the first relay 51 to be turned off.

The heater controller 715 determines power consumption for operating the COD heater when entering the cold starting mode or the shutdown mode and controls the COD heater to be operated on the basis of the determined power consumption. As an example, the heater controller 715 may determine the power consumption of the COD heater as a maximum load so that the temperature of the first cooling water may reach a target cooling water temperature within a shortest time when the COD heater is operated in the cold starting mode. Further, the heater controller 715 may determine the power consumption of the COD heater as a maximum load so that a residual power of the fuel cell stack may be consumed within a shortest time when the COD heater is operated in the shutdown mode.

In this case, when the communication state of the COD heater is normal, when the heater controller 715 transmits an operation control signal to the heater controller 52, the heater controller 52 may control the operation of the heater coil 53 according to the operation control signal from the heater controller 715. Meanwhile, when the communication state of the COD heater is poor, the heater controller 715 may directly control an ON/OFF operation of the COD heater.

In the cold staring mode, the COD heater heats the cooling water, that is, the first cooling water, flowing into the fuel cell stack. In this case, the heater controller 715 identifies the temperature of the cooling water at the inlet of the fuel cell stack in real-time while the COD heater is operating, allows the COD heater to be continuously operated until the temperature of the cooling water at the inlet of the fuel cell stack reaches a reference temperature, and turns off the COD heater when the temperature of the cooling water at the inlet of the fuel cell stack is greater than or equal to the reference temperature. In this case, the mode setting device 711 may release the cold starting mode.

In the shutdown mode, the COD heater dissipates thermal energy through the heater coil 53 to consume residual power of the fuel cell stack. In this case, the heater controller 715 identifies an output voltage of the fuel cell stack in real-time while the COD heater is operating and turns off the COD heater when the output voltage of the fuel cell stack is less than a reference voltage. In this case, the mode setting device 711 may release the shutdown mode.

Before the COD heater is operated, the heater controller 715 may operate heater protection logic for protecting the COD heater while the COD heater is operating.

Here, the heater protection logic may include a first heater protection logic 731 that monitors an operating voltage, communication failure and/or temperature overheating of the COD heater on the basis of a range between an upper limit voltage and a lower limit voltage in the cold starting mode and protects the COD heater from a problem situation and a second heater protection logic 735 that monitors the operating voltage, the communication failure, and/or the temperature overheating of the COD heater on the basis of an upper limit voltage range in the shutdown mode and protects the COD heater from a problem situation. The first heater protection logic 731 and the second heater protection logic 735 may be stored in the storage 730.

Accordingly, when entering the cold starting mode or the shutdown mode, the heater controller 715 may call and execute the first heater protection logic 731 or the second heater protection logic 735 stored in the storage 730 and detect and protect an operation state of the COD heater according to the executed heater protection logic. In this case, when a problem situation occurs while detecting the operation state of the COD heater, the heater controller 715 may turn off the COD heater or perform another operation.

As an example, the heater controller 715 calls and executes the first heater protection logic 731 in the cold starting mode and monitors the operation state of the COD heater according to the first heater protection logic 731 while the COD heater is operating.

In this case, the heater controller 715 may detect the operating voltage of the COD heater and turn off the COD heater according to the first heater protection logic 731 when the operating voltage of the COD heater is greater than an upper limit voltage $V_H$ or less than a lower limit voltage $V_L$.

Further, the heater controller 715 may monitor the communication state of the COD heater and may release the communication connection according to the first heater protection logic 731 when the communication state of the COD heater is poor. In this case, the heater controller 715 allows the COD heater to operate in the simple resistor mode. When the COD heater operates in the simple resistor mode, the heater controller 715 may increase the temperature of the first cooling water while controlling an ON/OFF operation of the COD heater itself. The heater controller 715 may turn off the COD heater when the temperature of the cooling water at the inlet of the fuel cell stack is greater than or equal to the reference temperature while the COD heater operates in the simple resistor mode. In this case, the mode setting device 711 may release the cold starting mode.

Further, the heater controller 715 may monitor the temperature of the COD heater and turn off the COD heater according to the first heater protection logic 731 when the temperature of the COD heater exceeds a reference temperature of $Y°$ C. and temperature control is not possible. Accordingly, the COD heater may be prevented from overheating. When the temperature of the COD heater exceeds the reference temperature of $Y°$ C. but the temperature control is possible, the heater controller 715 may adjust the power consumption of the COD heater according to the first heater protection logic 731 to prevent the COD heater from overheating.

As another example, the heater controller 715 calls and executes the second heater protection logic 735 in the shutdown mode and monitors the operation state of the COD heater according to the second heater protection logic 735 while the COD heater is operating.

In this case, the heater controller 715 may detect the operating voltage of the COD heater and turn off the COD heater according to the second heater protection logic 735 when the operating voltage of the COD heater is greater than the upper limit voltage $V_H$.

Further, the heater controller 715 may monitor the communication state of the COD heater and may release the communication connection according to the second heater protection logic 735 when the communication state of the COD heater is poor. In this case, the heater controller 715 allows the COD heater to operate in the simple resistor mode. When the COD heater operates in the simple resistor mode, the heater controller 715 may increase the temperature of the first cooling water while controlling an ON/OFF operation of the COD heater itself. The heater controller 715 may turn off the COD heater when the output voltage of the fuel cell stack is less than the reference voltage while the COD heater operates in the simple resistor mode. In this case, the mode setting device 711 may release the shutdown mode. In this way, according to the present disclosure, even when a problem situation such as communication failure occurs in the COD heater, power is directly supplied to the heater coil 53 so that the COD heater operates as a simple resistor, and thus the fuel cell system may be stably operated without stopping.

Further, the heater controller 715 may monitor the temperature of the COD heater and turn off the COD heater according to the second heater protection logic 735 when the temperature of the COD heater exceeds the reference temperature of Y° C. and temperature control is not possible. Accordingly, the COD heater may be prevented from overheating.

When the temperature of the COD heater exceeds the reference temperature of Y° C. but the temperature control is possible, the heater controller 715 may adjust the power consumption of the COD heater to output only a predetermined ratio of a % of the maximum load according to the second heater protection logic 735. Accordingly, while the COD heater is prevented from overheating, residual power of the fuel cell stack is consumed, and thus stability may be secured.

The communication device 720 may include a communication module for transmitting/receiving a signal and/or data in the fuel cell system. As an example, the communication module may receive, from the temperature sensors, information on the temperature of the cooling water at the inlet of the fuel cell stack and receive information on an output voltage of the fuel cell stack 10. Further, the communication module may receive information on the operation state of the COD heater while the COD heater is operating in the cold starting mode or the shutdown mode. Further, the communication module may transmit a control signal for driving the protection logics of the COD heater and/or a control signal for controlling the operation of the COD heater.

In this case, the communication module may communicate with respective components constituting the fuel cell system using a vehicle network communication technology. Here, the vehicle network communication technology may include controller area network (CAN) communication, local interconnect network (LIN) communication, flex-ray communication, or the like.

The storage 730 may store data and/or algorithms required for operating the fuel cell system. As an example, the storage 730 may store information on states of the fuel cell stack and the power electronic part in the TMS. The storage 730 may store operation state information of the COD heater operating in the cold starting mode or the shutdown mode. Further, the storage 730 may store protection logic, such as the first heater protection logic 731 and the second heater protection logic 735, for protecting the COD heater while the COD heater is operating.

Here, the storage 730 may include a storage medium such as a random access memory (RAM), a static RAM (SRAM), a read-only memory (ROM), a programmable ROM (PROM), and an electrically erasable programmable ROM (EEPROM).

An operation flow of the fuel cell system according to the present disclosure as configured above will be described below in more detail.

Figure 8:
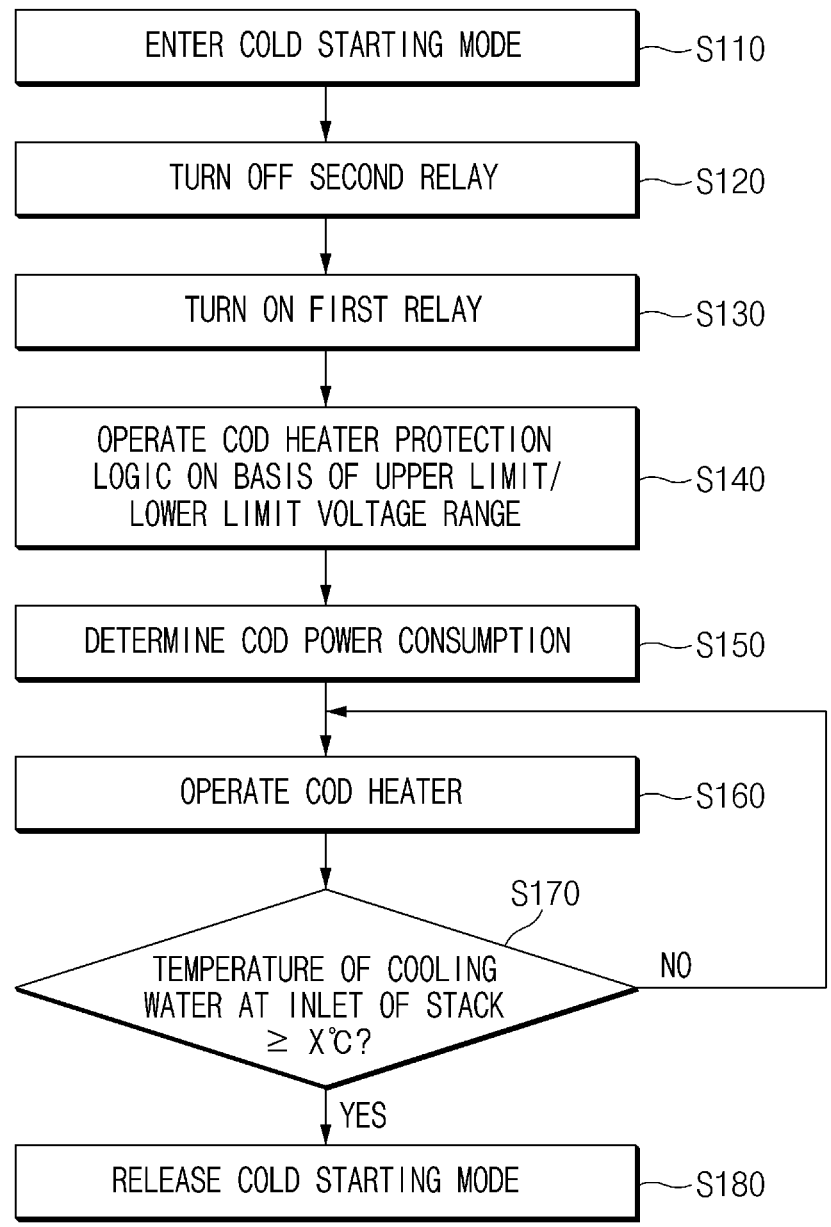
FIGS. 8 to 10 are views illustrating an operation flow of a method of controlling the heater of the fuel cell system according to an embodiment of the present disclosure.
Figure 9:
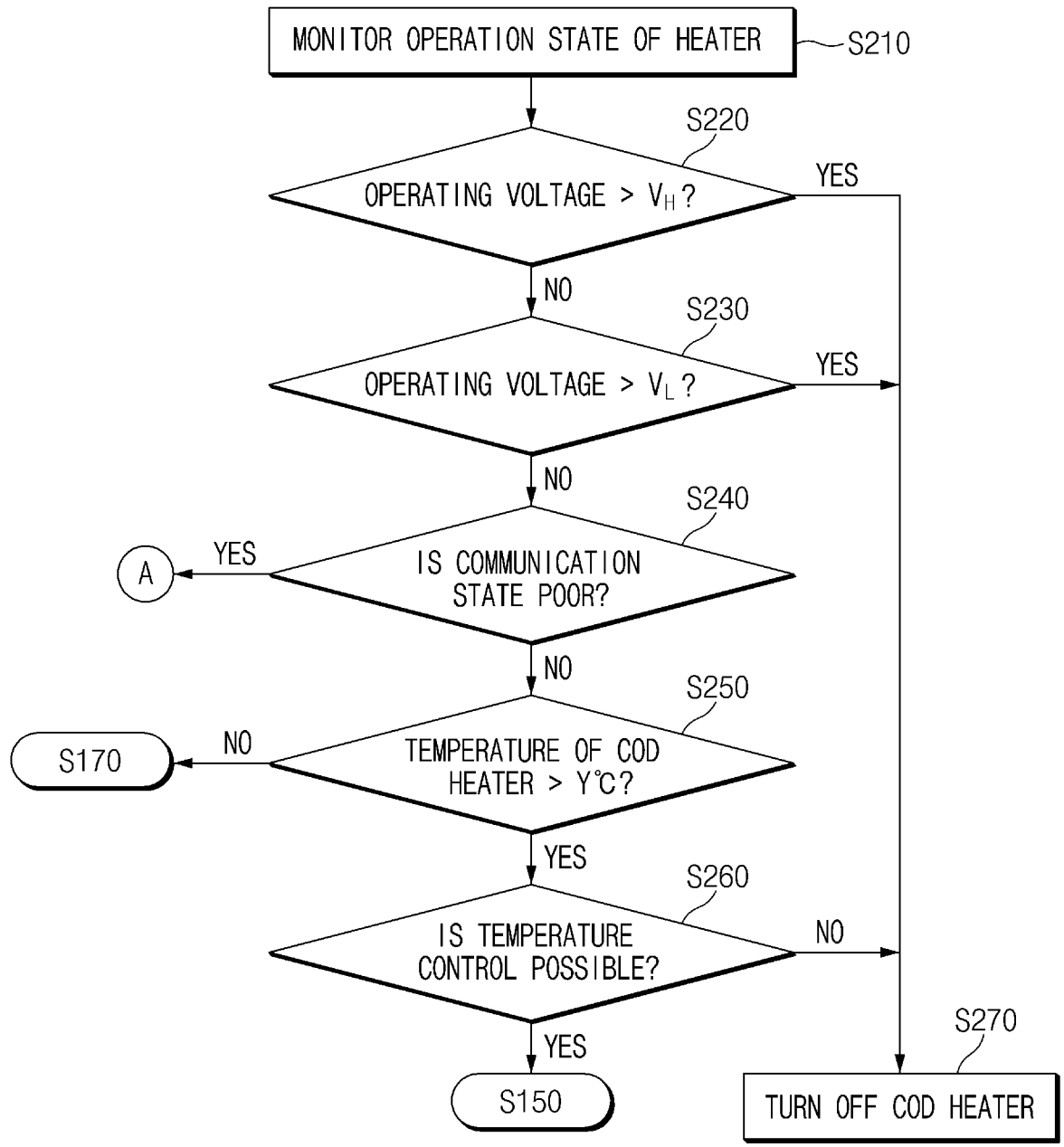
Figure 10:
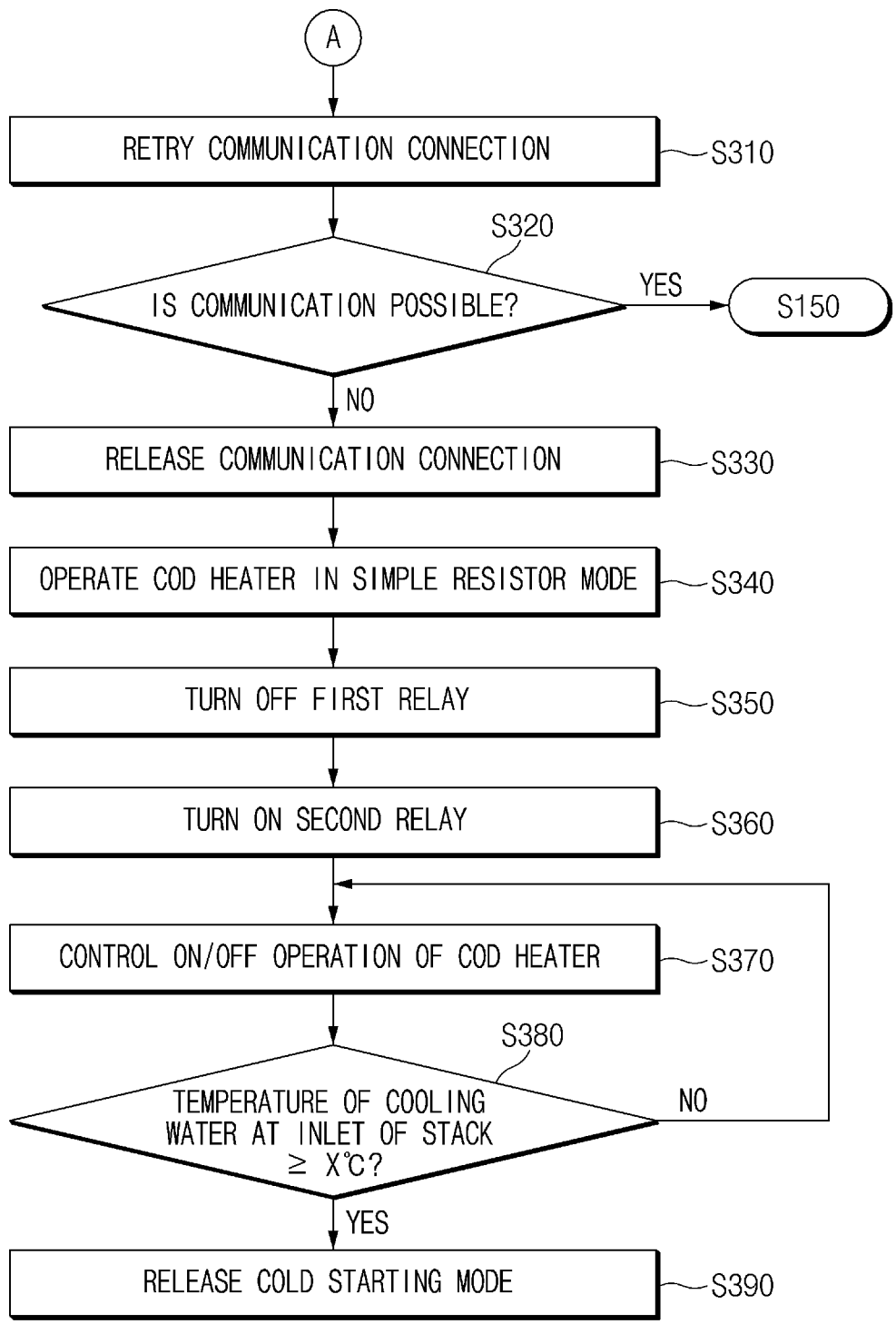

FIGS. 8 to 10 are views illustrating an operation flow of a method of controlling the heater of the fuel cell system according to an embodiment of the present disclosure.

First, FIG. 8 illustrates an operation flow for controlling the heater in the cold starting mode. Referring to FIG. 8, when entering the cold staring mode (S110), the fuel cell system controls the second relay 54 on the second control line 162 to be turned off (S120) and controls the first relay 51 on the first control line 161 to be turned on after the second relay 54 is turned off (S130). Here, the first control line 161 is a path which is connected to the heater coil 53 through the heater controller 52 and through which the power generated from the fuel cell stack is transmitted to the heater coil 53 under the control of the heater controller 52. Further, the second control line 162 is a path which is directly connected to the heater coil 53 and through which the power generated from the fuel cell stack is directly transmitted to the heater coil 53. Accordingly, the heater controller 52 is in a state capable of controlling the operation of the heater coil 53 as the first relay 51 is controlled to be turned on.

The fuel cell system operates the heater protection logic, for example, the first heater protection logic 731, for the COD heater on the basis of a preset range between the upper limit voltage $V_H$ and the lower limit voltage $V_L$ (S140). Here, the fuel cell system may monitor the operation state of the COD heater while the COD heater is operating for the cold starting on the basis of the first heater protection logic 731 and determine whether the operation state of the COD heater satisfies a preset first OFF condition. When the operation state of the COD heater satisfies the preset first OFF condition, the fuel cell system may turn off the COD heater to protect the COD heater according to the first heater protection logic 731. A detailed operation of the fuel cell system on the basis of the first heater protection logic 731 will be described with reference to an embodiment of FIG. 9.

Thereafter, the fuel cell system determines the power consumption for operating the COD heater for the cold starting (S150) and operates the COD heater on the basis of the power consumption determined in operation S150 (S160). In operation S150, the fuel cell system may determine power consumption required to increase the temperature of the first cooling water circulating along the first connection line and the first cooling line to the reference temperature. As an example, the fuel cell system may operate the COD heater at the maximum load so that the temperature of the first cooling water may reach the target cooling water temperature in the shortest time.

The fuel cell system may identify the temperature of the cooling water at the inlet of the fuel cell stack while the COD heater is operating and may perform operation S160 until the temperature of the cooling water at the inlet of the fuel cell stack reaches a reference temperature of X° C.

When the temperature of the cooling water at the inlet of the fuel cell stack is greater than or equal to the reference temperature of X° C., the fuel cell system terminates the operation of the COD heater and releases the cold starting mode (S180).

FIG. 9 illustrates an operation flow for protecting the heater in the cold starting mode. Referring to FIG. 9, when the heater protection logic, for example, the first heater protection logic 731, is operated in operation S140 of FIG. 8, the fuel cell system may monitor the operation state of the COD heater on the basis of the first heater protection logic 731 while the COD heater is operating (S210).

First, the fuel cell system may monitor the operating voltage of the COD heater on the basis of the first heater protection logic 731. In this case, when the operating voltage of the COD heater exceeds the upper limit voltage $V_H$ (S220) or when the operating voltage of the COD heater is less than the lower limit voltage $V_L$ (S230), the fuel cell system may turn off the COD heater according to the first heater protection logic 731 to prevent the COD heater from being damaged (S270).

Further, the fuel cell system may monitor the communication state of the COD heater on the basis of the first heater protection logic 731. When the communication state of the COD heater is poor (S240), the fuel cell system may perform an operation subsequent to "A" of FIG. 10.

Further, the fuel cell system may monitor the temperature of the COD heater on the basis of the first heater protection logic 731. When the temperature of the COD heater is less than the reference temperature of Y° C. (S250), the fuel cell system may perform operation S170 of FIG. 8 while the COD heater is operating.

When the temperature of the COD heater exceeds the reference temperature of Y° C. (S250) but the temperature control is possible (S260), the fuel cell system may perform operation S150 of FIG. 8 according to the first heater protection logic 731 to adjust the temperature of the COD heater and adjust the power consumption of the COD heater.

In contrast, when the temperature of the COD heater exceeds the reference temperature of Y° C. (S250) and the temperature control is not possible (S260), the fuel cell system may turn off the COD heater according to the first heater protection logic 731 to prevent the COD heater from overheating (S270).

FIG. 10 illustrates an avoidance operation when the communication state of the COD heater is poor in the cold starting mode. Referring to FIG. 10, the fuel cell system retries the communication connection of the COD heater (S310) when the communication state of the COD heater is poor and then performs operation S150 of FIG. 8 when the COD heater becomes communicable (S320).

On the other hand, when a communication impossible state continues (S320) even after the communication connection of the COD heater is retried, the fuel cell system releases the communication connection of the COD heater (S330) and allows the COD heater to operate in the simple resistor mode (S340). To this end, the fuel cell system controls the first relay 51 on the first control line 161 to be turned off (S350) and controls the second relay 54 on the second control line 162 to be turned on (S360) after the first relay 51 is turned off.

When power of the fuel cell stack is applied to the heater coil 53 of the COD heater through the second control line 162 as the second relay 54 is controlled to be turned on, the fuel cell system controls the ON/OFF operation of the COD heater (S370). In this case, even when the COD heater is incapable of communication, the heater coil 53 is configured as a simple resistor to control the ON/OFF operation of the COD heater, and thus the fuel cell system may be normally operated.

Operation S370 is performed until the temperature of the cooling water at the inlet of the fuel cell stack reaches the reference temperature of X° C., and when the temperature of the cooling water at the inlet of the fuel cell stack exceeds the reference temperature (S380), the fuel cell system turns off the COD heater and releases the cold starting mode (S390).

Figure 11:
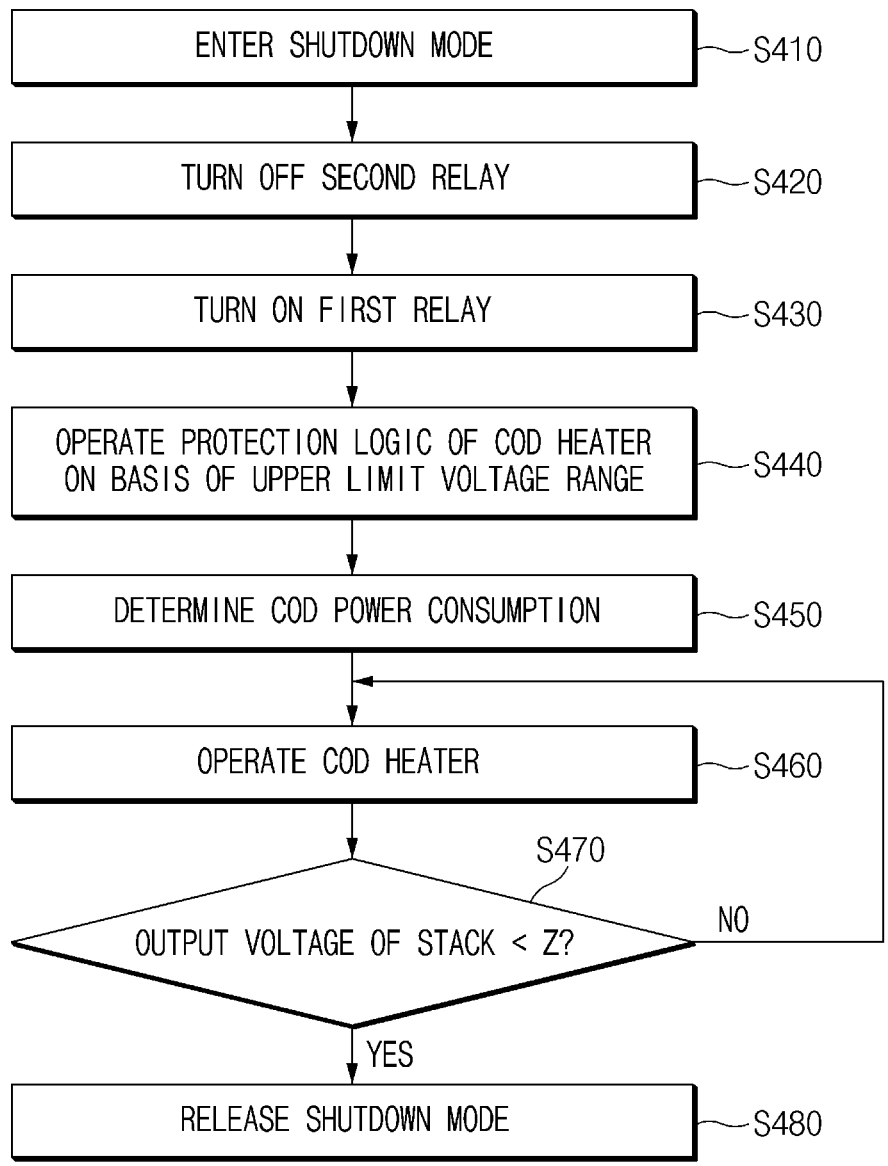
FIGS. 11 to 13 are views illustrating an operation flow of a method of controlling the heater of the fuel cell system according to another embodiment of the present disclosure.
Figure 12:
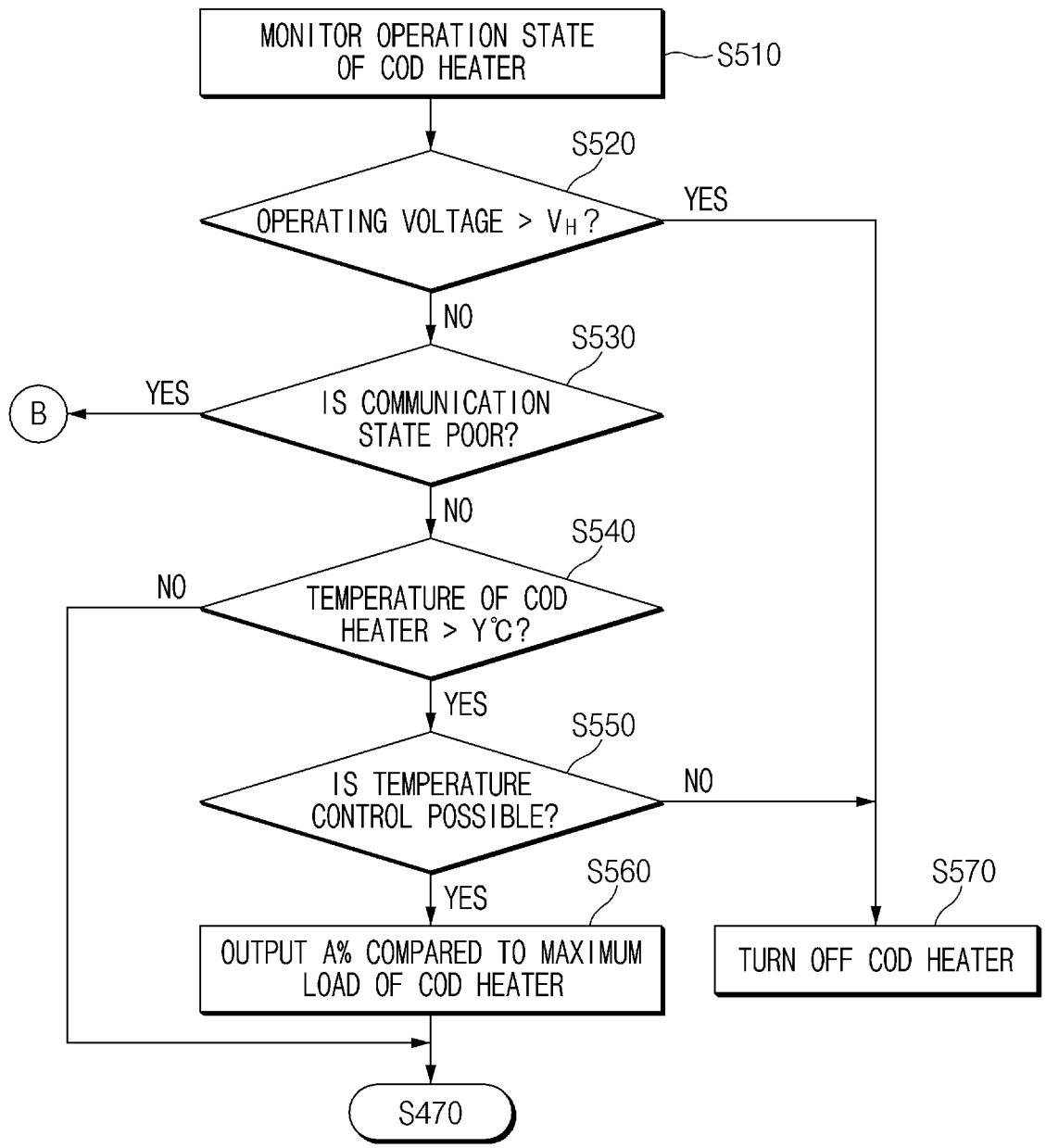
Figure 13:
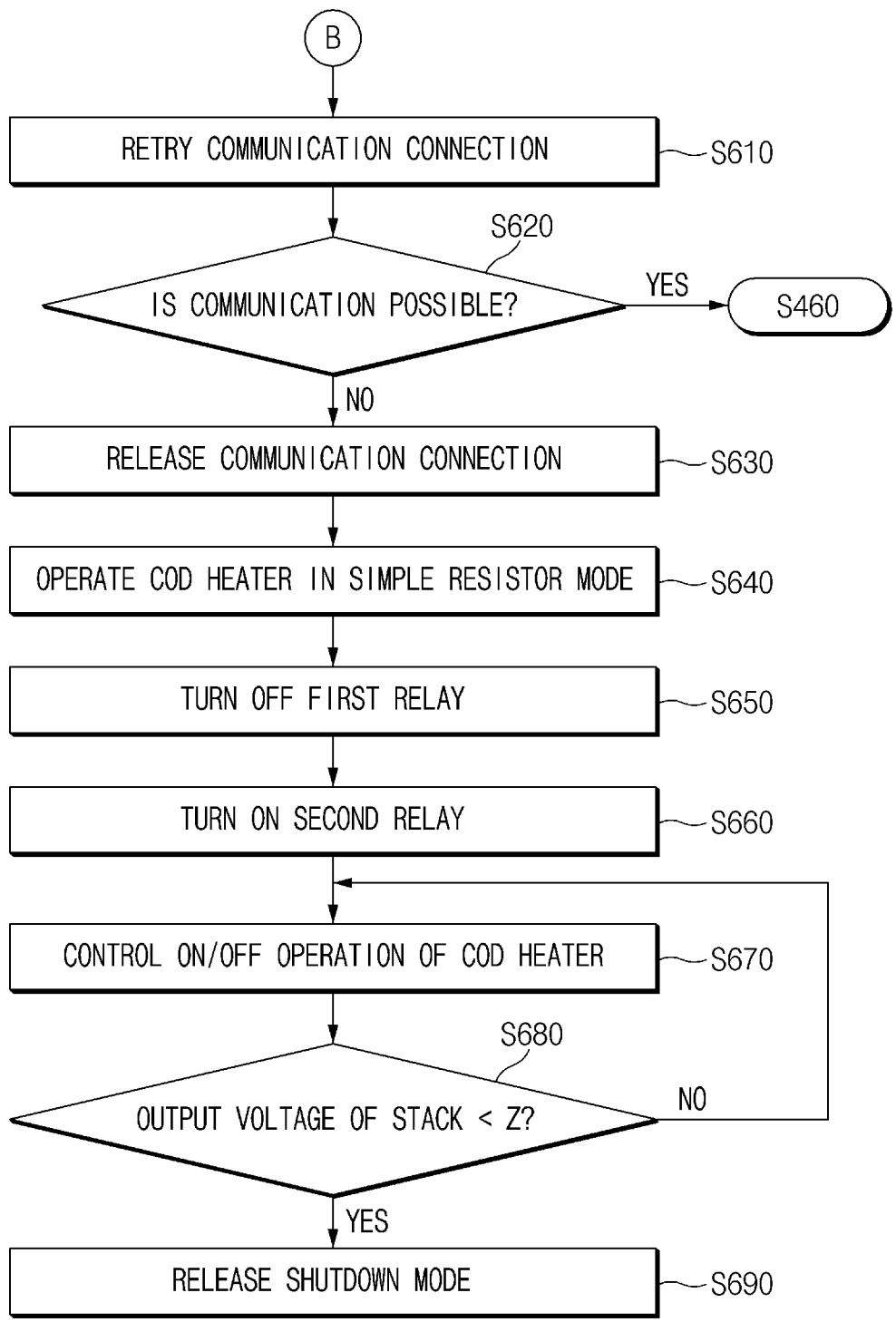

FIGS. 11 to 13 are views illustrating an operation flow of a method of controlling the heater of the fuel cell system according to another embodiment of the present disclosure.

FIG. 11 illustrates a control operation flow in the shutdown mode. Referring to FIG. 11, when entering the shutdown mode (S410), the fuel cell system controls the second relay 54 on the second control line 162 to be turned off (S420) and controls the first relay 51 on the first control line 161 to be turned on after the second relay 54 is turned off (S430). Here, the first control line 161 is a path which is connected to the heater coil 53 through the heater controller 52 and through which the power generated from the fuel cell stack is transmitted to the heater coil 53 under the control of the heater controller 52. Further, the second control line 162 is a path which is directly connected to the heater coil 53 and through which the power generated from the fuel cell stack is directly transmitted to the heater coil 53. Accordingly, the heater controller 52 is in a state capable of controlling the operation of the heater coil 53 as the first relay 51 is controlled to be turned on.

Thereafter, the fuel cell system operates the heater protection logic, for example, the second heater protection logic 735, for the COD heater on the basis of a preset range of the upper limit voltage $V_H$ (S440). Here, the fuel cell system may monitor the operation state of the COD heater on the basis of the second heater protection logic 735 while the COD heater is operating for shutdown and determine whether the operation of the COD heater satisfies a preset second OFF condition. When the operation state of the COD heater satisfies the preset second OFF condition, the fuel cell system may turn off the COD heater according to the second heater protection logic 735 to protect the COD heater. A detailed operation of the fuel cell system on the basis of the second heater protection logic 735 will be described with reference to an embodiment of FIG. 12.

Thereafter, the fuel cell system determines the power consumption for operating the COD heater for the shutdown (S450) and operates the COD heater on the basis of the power consumption determined in operation S450 (S460). In operation S450, the fuel cell system may determine the power consumption of the COD heater on the basis of the residual power among the power generated by the fuel cell stack. As an example, the fuel cell system may determine the power consumption of the COD heater as a maximum load to consume the residual power of the fuel cell stack in a shortest time.

The fuel cell system may identify the output voltage of the fuel cell stack while the COD heater is operating and perform operation S460 until the output voltage of the fuel cell stack reaches a reference voltage "Z".

When the output voltage of the fuel cell stack is less than the reference voltage "Z", the fuel cell system terminates the operation of the COD heater and releases the shutdown mode (S480).

FIG. 12 illustrates an operation flow for protecting the heater in the shutdown mode. Referring to FIG. 12, when the heater protection logic, for example, the second heater protection logic 735, is operated in operation S440, the fuel cell system may monitor the operation state of the COD heater on the basis of the second heater protection logic 735 while the COD heater is operating (S510).

First, the fuel cell system may monitor the operating voltage of the COD heater on the basis of the second heater protection logic 735. In this case, when the operating voltage of the COD heater exceeds the upper limit voltage $V_H$ (S520), the fuel cell system may turn off the COD heater on the basis of the second heater protection logic 735 to protect the COD heater (S570).

Further, the fuel cell system may monitor the communication state of the COD heater on the basis of the second heater protection logic 735. When the communication state of the COD heater is poor (S530), the fuel cell system may perform an operation subsequent to "B" of FIG. 13.

Further, the fuel cell system may monitor the temperature of the COD heater on the basis of the second heater protection logic 735. When the temperature of the COD heater is less than the reference temperature of Y° C. (S540), the fuel cell system may perform operation S470 of FIG. 11 while the COD heater is operating.

When the temperature of the COD heater exceeds the reference temperature of Y° C. (S540) but the temperature control is possible (S550), the fuel cell system may output the power consumption of the COD heater by a predetermined ratio of a % compared to the maximum load according to the second heater protection logic 735 to adjust the temperature of the COD heater (S560) and then perform operation S470 of FIG. 11.

On the other hand, when the temperature of the COD heater exceeds the reference temperature of Y° C. (S540), and the temperature control is not possible (S550), the fuel cell system may turn off the COD heater according to the second heater protection logic 735 to prevent the COD heater from overheating (S570).

FIG. 13 illustrates an avoidance operation when the communication state of the COD heater is poor in the shutdown mode. Referring to FIG. 13, the fuel cell system retries the communication connection of the COD heater (S610) when the communication state of the COD heater is poor and then performs operation S460 of FIG. 11 when the COD heater becomes communicable (S620).

On the other hand, when a communication impossible state continues (S620) even after the communication connection of the COD heater is retried, the fuel cell system releases the communication connection of the COD heater (S630) and allows the COD heater to operate in the simple resistor mode (S640). To this end, the fuel cell system controls the first relay 51 on the first control line 161 to be turned off (S650) and controls the second relay 54 on the second control line 162 to be turned on (S660) after the first relay 51 is turned off.

When power of the fuel cell stack is applied to the heater coil 53 of the COD heater through the second control line 162 as the second relay 54 is controlled to be turned on, the fuel cell system controls the ON/OFF operation of the COD heater (S670). In this case, even when the COD heater is incapable of communication, the heater coil 53 is configured as a simple resistor to control the ON/OFF operation of the COD heater, and thus the fuel cell system may be normally operated.

Operation S670 is performed until the output voltage of the fuel cell stack reaches the reference voltage "Z", and when the output voltage of the fuel cell stack becomes less than the reference voltage "Z" (S680), the fuel cell system turns off the COD heater and releases the shutdown mode (S690).

According to the present disclosure, a cathode oxygen depletion (COD) heater is controlled in consideration of characteristics of a fuel cell stack in a cold starting mode or a shutdown mode, and thus thermal management control of the fuel cell system may be efficiently operated.

Further, according to the present disclosure, when the heater cannot be controlled due to a communication error of the heater, the heater is processed as a simple resistor to control an operation of the heater, and thus the thermal management control of the fuel cell system may be stably operated.

The above description is merely illustrative of the technical spirit of the present disclosure, and those skilled in the art to which the present disclosure belongs may make various modifications and changes without departing from the essential features of the present disclosure.

An aspect of the present disclosure provides a fuel cell system and a method of controlling a heater thereof, in which a cathode oxygen depletion (COD) heater is controlled in consideration of characteristics of a fuel cell stack in a cold staring mode or a shutdown mode, and thus thermal management control of the fuel cell system may be efficiently operated.

Another aspect of the present disclosure provides a fuel cell system and a method of controlling a heater thereof, in which, when the heater cannot be controlled due to a communication error of the heater, the heater is processed as a simple resistor to control an operation of the heater, and thus the thermal management control of the fuel cell system may be stably operated.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A fuel cell system comprising:
 a cathode oxygen depletion (COD) heater disposed on a line through which cooling water flowing into a fuel cell stack circulates and configured to heat the cooling water or consume residual power of the fuel cell stack; and a controller configured to determine power consumption based on a target heating amount of the COD heater and control an operation of the COD heater based on the determined power consumption, wherein the controller is further configured to determine the power consumption based on the target heating amount for consuming the residual power of the fuel cell stack until an output voltage of the fuel cell stack becomes less than a reference voltage in a shutdown mode.

2. The fuel cell system of claim 1, wherein, in a cold starting mode, the controller is further configured to determine the power consumption based on the target heating amount for heating the cooling water until a temperature of the cooling water at an inlet of the fuel cell stack reaches a reference temperature.

3. The fuel cell system of claim 2, wherein the controller is further configured to determine the power consumption as a maximum load of the COD heater.

4. The fuel cell system of claim 2, wherein the controller is further configured to turn off the COD heater and release the cold starting mode when the temperature of the cooling water at the inlet of the fuel cell stack becomes greater than or equal to the reference temperature.

5. The fuel cell system of claim 1, wherein the controller is further configured to determine the power consumption as a maximum load of the COD heater.

6. The fuel cell system of claim 1, wherein the controller turns off the COD heater and releases the shutdown mode when the output voltage of the fuel cell stack becomes less than the reference voltage.

7. The fuel cell system of claim 1, wherein the COD heater comprises:
a heater coil;
a heater controller configured to control a heating operation of the heater coil;
a first relay disposed on a first control line connected to the heater controller and configured to interrupt power supply through the first control line; and
a second relay disposed on a second control line connected to the heater coil and configured to interrupt power supply through the second control line.

8. The fuel cell system of claim 7, wherein the controller is further configured to control the second relay to be turned off and then control the first relay to be turned on when entering a cold starting mode or the shutdown mode.

9. The fuel cell system of claim 8, wherein, when entering the cold starting mode or the shutdown mode, the controller is further configured to operate heater protection logic before operating the COD heater and monitor an operation state of the COD heater based on the heater protection logic while the COD heater is operating.

10. The fuel cell system of claim 9, wherein, when a communication state of the COD heater is poor, the controller is further configured to release communication connection of the COD heater and allow the COD heater to operate in a simple resistor mode.

11. The fuel cell system of claim 10, wherein, when the COD heater operates in the simple resistor mode, the controller is further configured to control the first relay to be turned off and then control the second relay to be turned on.

12. The fuel cell system of claim 10, wherein, when the COD heater operates in the simple resistor mode, the controller is further configured to control an ON or OFF operation of the COD heater according to a heating amount of the COD heater.

13. The fuel cell system of claim 9, wherein the controller is further configured to turn off the COD heater according to the heater protection logic when an operating voltage of the COD heater exceeds a reference voltage range, the operating voltage of the COD heater is less than a lower limit voltage, or a temperature of the COD heater exceeds a reference temperature and temperature control is not possible.

14. The fuel cell system of claim 9, wherein, when a temperature of the COD heater exceeds a reference temperature and temperature control is possible, the controller is further configured to adjust the power consumption of the COD heater.

15. The fuel cell system of claim 14, wherein, when the temperature of the COD heater being operated exceeds the reference temperature and the temperature control is possible in the shutdown mode, the controller is further configured to output the power consumption of the COD heater by a predetermined ratio compared to a maximum load of the COD heater.

16. A method of controlling a heater of a fuel cell system, the method comprising:
determining power consumption based on a target heating amount of a cathode oxygen depletion (COD) heater disposed on a line through which cooling water flowing into a fuel cell stack circulates, and heating the cooling water or consuming residual power of the fuel cell stack; and
controlling an operation of the COD heater based on the determined power consumption,
wherein the determining of the power consumption comprises determining the power consumption based on the target heating amount for consuming the residual power of the fuel cell stack until an output voltage of the fuel cell stack becomes less than a reference voltage in a shutdown mode.

17. The method of claim 16, wherein the determining of the power consumption comprises determining the power consumption based on the target heating amount for heating the cooling water until a temperature of the cooling water at an inlet of the fuel cell stack reaches a reference temperature in a cold starting mode.

18. The method of claim 16, further comprising:
operating heater protection logic before the COD heater is operated when entering a cold starting mode or the shutdown mode; and
monitoring an operation state of the COD heater based on the heater protection logic while the COD heater is operating.

* * * * *